United States Patent
Bott et al.

(10) Patent No.: US 10,654,348 B2
(45) Date of Patent: May 19, 2020

(54) LID OF A VEHICLE ROOF HAVING AN INSERT FOR A MOULDED PLASTIC PORTION

(71) Applicant: WEBASTO SE, Stockdorf (DE)

(72) Inventors: Guido Bott, Stockdorf (DE); Peter Strohmayr, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/775,857

(22) PCT Filed: Oct. 24, 2016

(86) PCT No.: PCT/EP2016/075549
§ 371 (c)(1),
(2) Date: May 14, 2018

(87) PCT Pub. No.: WO2017/089053
PCT Pub. Date: Jun. 1, 2017

(65) Prior Publication Data
US 2018/0326831 A1    Nov. 15, 2018

(30) Foreign Application Priority Data
Nov. 25, 2015   (DE) .................. 10 2015 120 408

(51) Int. Cl.
*B60J 10/82*    (2016.01)
*B60J 7/22*     (2006.01)
(Continued)

(52) U.S. Cl.
CPC .............. *B60J 10/82* (2016.02); *B60J 7/04* (2013.01); *B60J 7/043* (2013.01); *B60J 7/22* (2013.01)

(58) Field of Classification Search
CPC ..... B60J 7/22; B60J 7/223; B60J 7/043; B60J 10/82
(Continued)

(56) References Cited

U.S. PATENT DOCUMENTS

| 4,971,387 A | 11/1990 | Bohm et al. |
| 6,893,084 B2 * | 5/2005 | Tamura .................... B60J 10/24 296/216.09 |

(Continued)

FOREIGN PATENT DOCUMENTS

| DE | 39 08 750 C1 | 6/1990 |
| DE | 103 36 361 B3 | 6/2005 |

(Continued)

OTHER PUBLICATIONS

International Preliminary Report on Patentability issued against International Application No. PCT/EP2016/075549 dated May 29, 2018.
(Continued)

*Primary Examiner* — Dennis H Pedder
(74) *Attorney, Agent, or Firm* — Fitch, Even, Tabin & Flannery, LLP

(57) ABSTRACT

A lid member of a vehicle roof is disclosed having a plate-like lid body having an inner and an outer large face, to which a moulded plastic portion has been moulded. The moulded plastic portion can be configured to receive an insert which is embodied as a hollow body, and which rests against the inner large face of the lid body. The insert may have an abutment flange, which limits a hollow space opening and which is provided with a circumferential sealing rib which rests against the inner large face of the lid body.

14 Claims, 5 Drawing Sheets

(51) Int. Cl.
*B60J 7/04* (2006.01)
*B60J 7/043* (2006.01)

(58) Field of Classification Search
USPC .............................. 296/217, 216.06–216.09
See application file for complete search history.

(56) References Cited

U.S. PATENT DOCUMENTS

| | | | |
|---|---|---|---|
| 7,032,963 B2 * | 4/2006 | Deppe .................. | B60J 7/22 |
| | | | 296/216.06 |
| 7,404,598 B2 | 7/2008 | Huebner et al. | |
| 7,866,741 B2 * | 1/2011 | Horiuchi .................. | B60J 7/22 |
| | | | 296/217 |
| 2010/0013270 A1 | 1/2010 | Bergmiller et al. | |

FOREIGN PATENT DOCUMENTS

| | | |
|---|---|---|
| DE | 20 2005 018982 U1 | 3/2006 |
| DE | 10 2007 015 709 A1 | 8/2008 |
| DE | 10 2010 048 457 A1 | 4/2012 |
| DE | 10 2014 106375 A1 | 11/2015 |
| DE | 10 2014 106803 A1 | 11/2015 |
| EP | 1 491 377 A2 | 12/2004 |
| JP | 429474 * | 7/2009 |

OTHER PUBLICATIONS

International Search Report for PCT/EP2016/075549 dated Feb. 21, 2017 and English translation submitted herewith (8 Pages).

* cited by examiner

LID OF A VEHICLE ROOF HAVING AN INSERT FOR A MOULDED PLASTIC PORTION

CROSS-REFERENCE TO RELATED APPLICATIONS

This application is a U.S. national phase application filed under 35 U.S.C. § 371 of International Application No. PCT/EP2016/075549, filed Oct. 24, 2016, designating the United States, which claims priority from German Patent Application 102015120408.8, filed Nov. 25, 2015, which are hereby incorporated herein by reference in their entirety for all purposes.

FIELD

The invention relates to a lid member of a vehicle roof having the features of the preamble of claim 1.

BACKGROUND

Such lid members are known from practice and in particular form an advanceable lid member of a sliding roof system of a vehicle roof. The lid member can be displaced between a closed position closing a roof opening and an open position clearing the roof opening at the very least partially. In order to preclude, in the open position, air turbulences in the vehicle interior that might be troublesome and in order to optimise the noise behaviour, vehicle roofs often have a deployable air deflector. Said air deflector includes a deploying element, which extends in the transverse direction of the vehicle, and which is provided on each of its two sides with a deploying arm, which is articulated to the roof structure. In the closed position of the lid member, the air deflector is pressed down by means of the lid member. In the open position of the lid member, the air deflector is cleared such that it can be pivoted out into its deployed approach position, induced by the effect of the deploying springs on the deploying arms. When the lid member is being displaced starting from the open position into the closed position, the lid member is advanced onto the deploying arms via cams, the air deflector thereby being pressed down into its rest position. Said cams can be embodied as inserts of a circumferential edge section provided with foam material and belonging to a plate-like lid body of the lid member, and said cams can constitute hollow bodies. When moulding the circumferential edge foam section to the lid body, the inserts are brought into contact with the lid body. During the foam moulding process, air can, however, escape from the hollow body, which can in turn lead to bubbles and/or blow holes in the edge foam section. Said bubbles and blow holes constitute optical imperfections, which either have to be removed by a further treatment or lead to rejects.

It is the object of the invention to create a lid member of the type referred to in the introduction, with which, despite having a hollow insert, the risk of bubbles and blow holes being formed is minimised.

SUMMARY

This object is attained in accordance with the invention by the lid member having the features of claim 1.

In the lid member according to the invention, the circumferential sealing rib, which rests against the inner large face of the lid body, allows no air to escape from a hollow space of the insert while the moulded plastic portion is being produced. In this way, the formation of bubbles, blow holes or the same in the moulded plastic portion can effectively be prevented owing to the insert which is embodied as a hollow body.

In principle, the insert of the lid member according to the invention can be manufactured from any material. Preferably, however, the insert constitutes an injection-moulded plastic article.

The lid member according to the invention is in particular an advanceable lid member of a sliding roof system of a vehicle roof. The lid member according to the invention can, however, also be a fixed roof element, which is rigidly connected to a vehicle structure.

The plate-like lid body of the lid member is preferably embodied so as to be transparent and is in particular manufactured from glass. It is, however, also conceivable that the lid body is manufactured from a plastic material such as polycarbonate material.

In an embodiment of the lid member according to the invention that is particularly easy to produce, the circumferential sealing rib is embodied in one piece with the abutment flange. In a plastic injection-moulding process for manufacturing the insert, the sealing rib can then be also be moulded at this stage.

In an alternative embodiment of the lid member according to the invention, the sealing rib is embodied as a separate sealing element, which is arranged between the inner large face of the lid body and the abutment flange. For example, the separate sealing element is formed from a foam strap or from an O-ring and might be received by a groove of the insert for positioning.

The sealing rib and the insert can be formed from the same material or also from different materials. In the latter case, it is conceivable that the insert is embodied as a two-component injection-moulded plastic part and that a base body of the insert that includes the hollow space and the abutment flange is formed from a first plastic material and the sealing rib is formed from a second plastic material having favourable sealing properties.

In a special embodiment of the lid member according to the invention, the sealing rib, starting from the abutment flange, has a height of approximately 0.1 mm to 0.5 mm, in particular of 0.2 mm to 0.3 mm. A lower height might not be able to guarantee the needed tightness, whereas a larger height would take away some of the installation space that is needed.

In a lid member that is embodied as an advanceable lid member of a sliding roof system, the insert can comprise a cam for an air deflector of the vehicle roof, said air deflector being deployable as a function of a position of the lid member. The cam serves to advance, when the lid member is being advanced into a closed position covering a roof opening, onto the deployed air deflector in order to displace said air deflector into its lowerable rest position against the force of deploying springs.

To further improve the displacement behaviour of the air deflector, it can be advantageous if the insert, besides the cam, comprises a pilot cam for the air deflector, said pilot cam being arranged between the cam and a front edge of the lid member and triggering a first pivoting movement of the air deflector when the same is being displaced into the rest position.

The moulded plastic portion of the lid member according to the invention is in particular a circumferential edge foam section of the lid body. Via the edge foam section, the lid member can be joined to displacing kinematics of a sliding roof system with the aid of holding tabs or the same being inserts of the foam.

Further advantages and advantageous configurations of the subject-matter of the invention can be taken from the description, from the drawing and from the claims.

BRIEF DESCRIPTIONS OF THE DRAWING

One exemplary embodiment of a lid member according to the invention is illustrated in a schematically simplified way in the drawing and will be explained in more detail in the following description.

DETAILED DESCRIPTION

Figure 1:
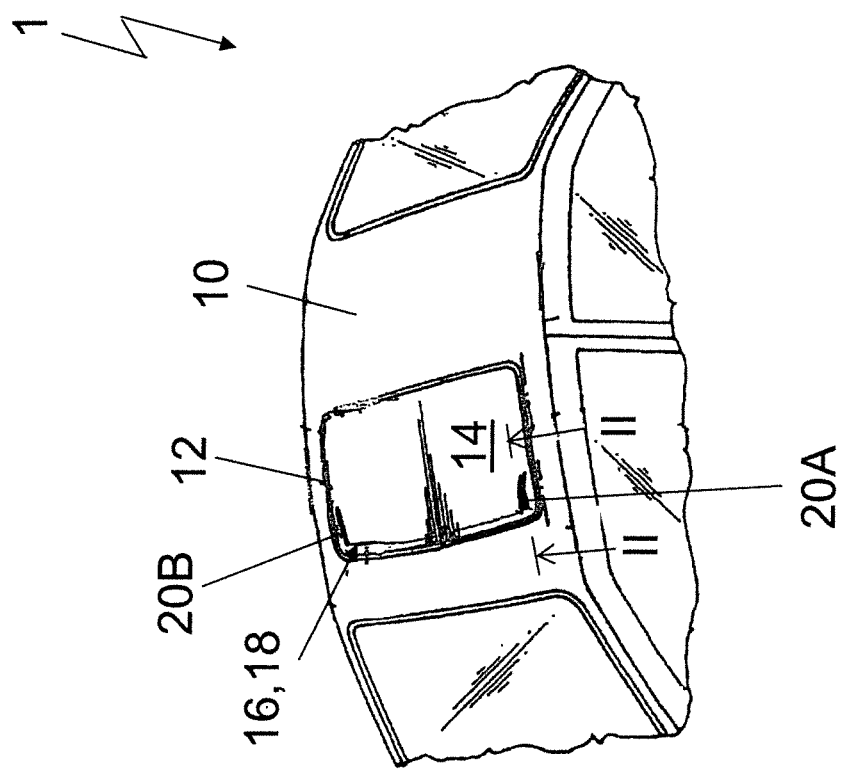
FIG. 1 shows a perspective view of a vehicle roof according to the invention.
Figure 2:
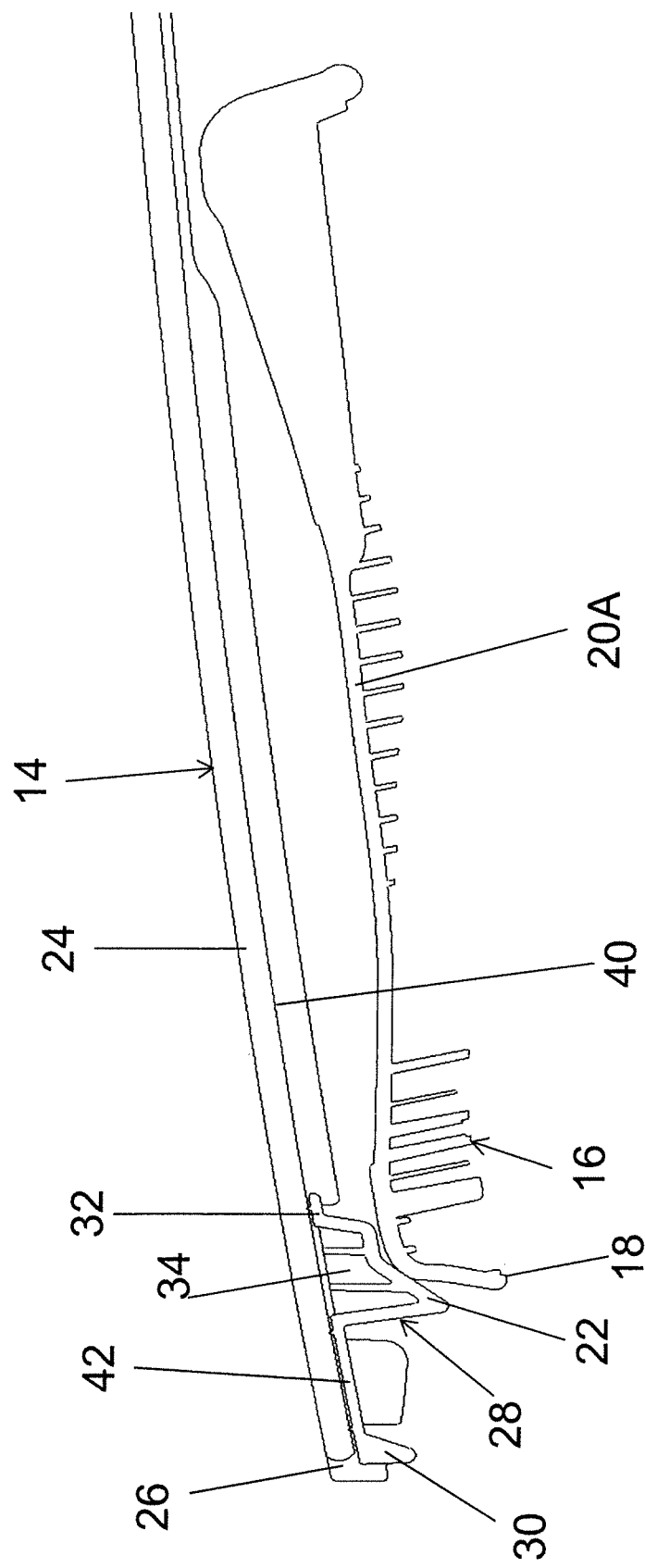
FIG. 2 shows a longitudinal section through a lid member and through an air deflector of the vehicle roof along line II-II in FIG. 1.
Figure 3:
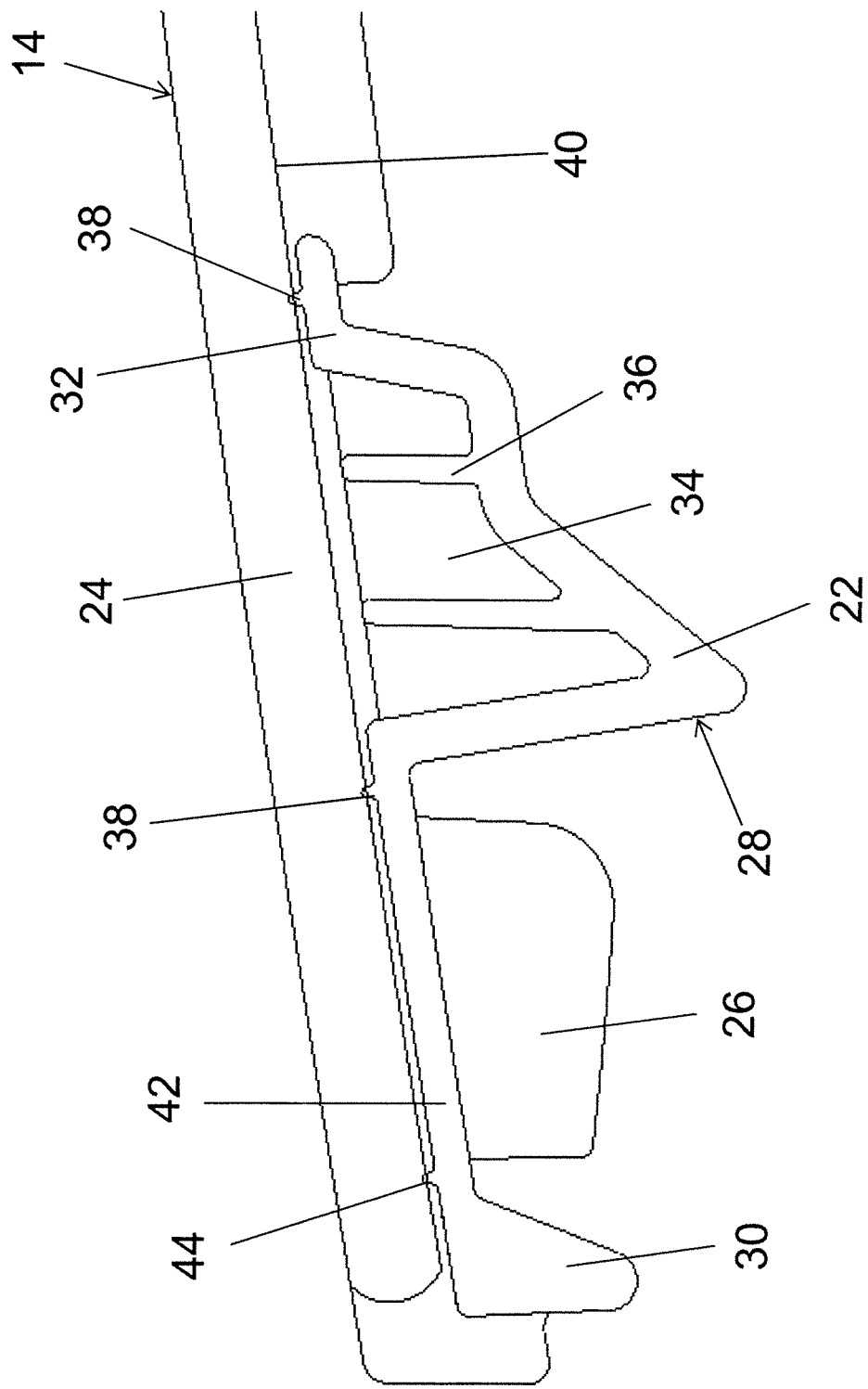
FIG. 3 shows an enlarged sectional illustration of a front edge area of the lid member.
Figure 4:
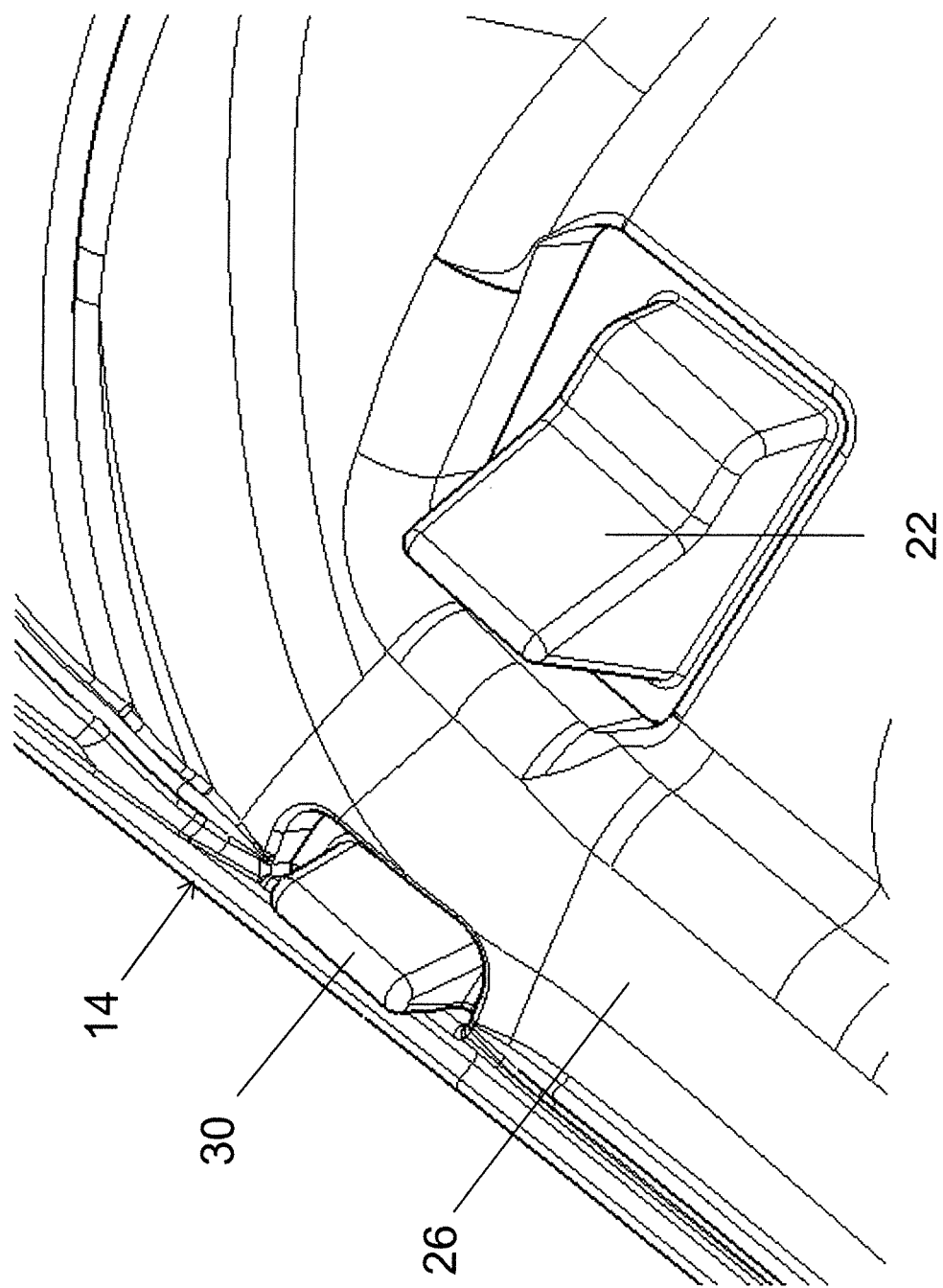
FIG. 4 shows a perspective bottom view of the lid member in the area of a cam for the air deflector.

In FIG. 1, a passenger car 1 having a vehicle roof 10 is illustrated, being provided with a roof cutout 12. Furthermore, the vehicle roof 10 has a sliding roof system having a lid member 14, which can be displaced between a closed position closing the roof cutout 12 and an open position clearing the roof cutout 12.

In order to suppress, in the open position of the lid member 14, possibly troublesome air turbulences in an interior of the passenger car 1 and in order to improve the noise behaviour when the roof cutout 12 is open, an air deflector 16 is arranged in the front edge area of the roof cutout 12, said air deflector having an air deflector lamella 18, which extends in the transverse direction of the roof, and which is connected to a deploying arm 20A or 20B on each of its two sides, said deploying arms being joined to the vehicle structure with their respective end facing away from the deflector lamella. The air deflector 16 is in a lowered rest position in the closed position of the lid member 14 and is in a deployed active position in the open position of the lid member 14. The air deflector 16 is controlled with the aid of the lid member 14, which presses the air deflector 16 down in the closed position against the force of deploying springs and clears the air deflector 16 in the cleared position, such that the same can automatically be deployed owing to the effect of the deploying springs. Hereunto, one cam 22 is arranged at the bottom side of the lid member 14 in relation to a vertical longitudinal centre plane of the roof on each of its two sides, said cam interacting with the respective deploying arm 20A or 20B, wherein in FIGS. 2 to 5, only the cam that is arranged on the left in relation to the forward direction of travel is illustrated. The cam arranged on the right in relation to the forward direction of travel of the vehicle is embodied in a corresponding manner.

The lid member 14 comprises a lid body 24 that is formed from a glass panel and is embodied so as to be plate-like, and which includes a circumferential edge foam section made of a polyurethane foam material, said edge foam section forming a moulded plastic portion 26. Into the moulded plastic portion 26, in relation to the vertical longitudinal centre plane of the roof, an insert 28 is embedded on each of its two sides, said insert 28 forming the respective cam 22 embodied as a nose-like projection as well as a respective pilot cam that is also embodied so as to be nose-like and is arranged between the respective cam 22 and a front edge of the lid member 14.

Figure 5:
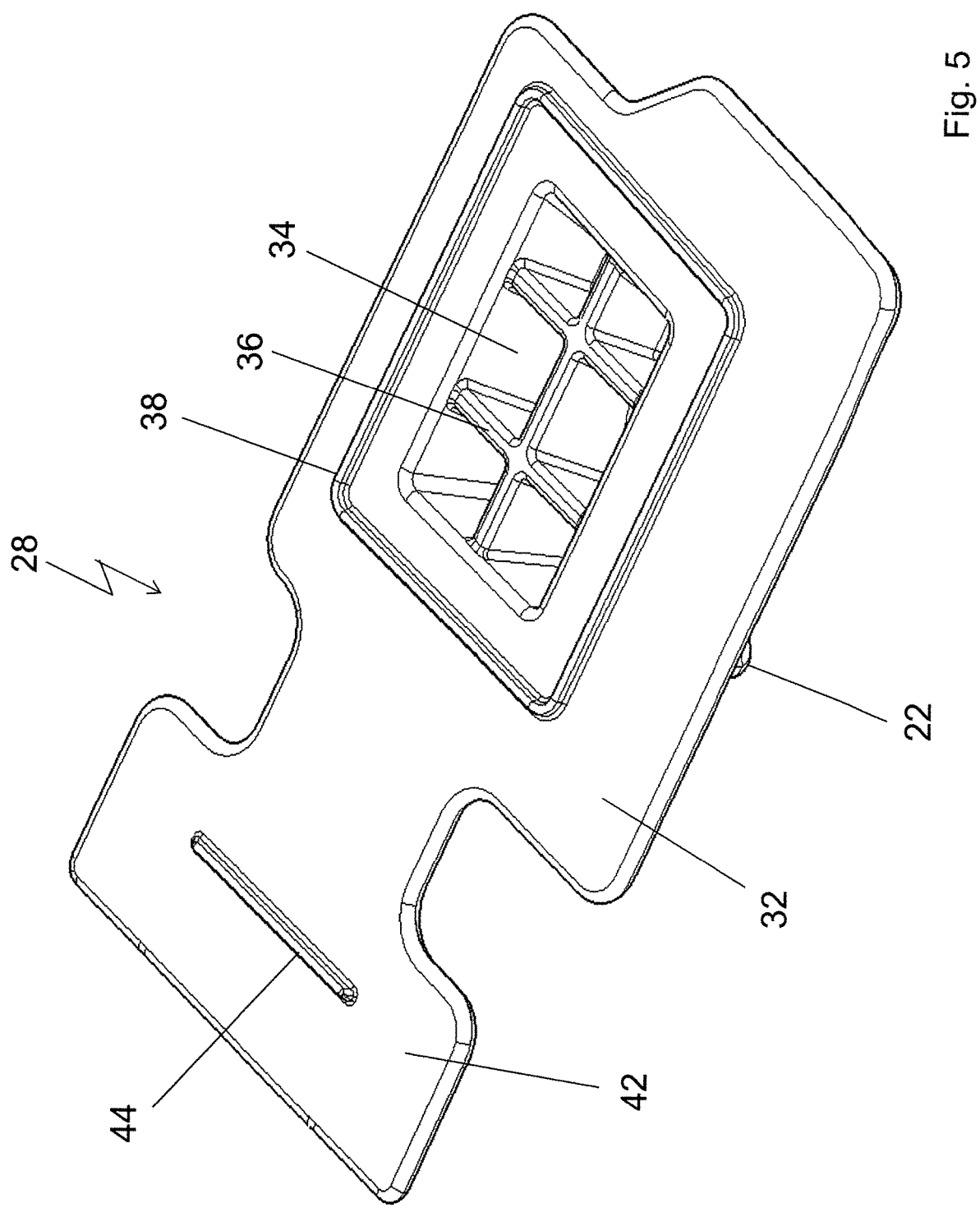
FIG. 5 shows a perspective view of an insert forming the cam taken alone.

The inserts 28 each are formed from an injection-moulded plastic article illustrated in FIG. 5 taken alone, said injection-moulded plastic article constituting a hollow body, which is provided with an abutment flange 32. The abutment flange 32 circumferentially surrounds a hollow space opening 34 filling up the cam 22 and provided with a ribbing 36. Circumferentially around the hollow space opening 34, a sealing rib 38 is arranged on the abutment flange 32, said sealing rib being manufactured in one piece with the insert 28. The sealing rib 38 has a height of approximately 0.2 mm to 0.3 mm and rests against the lower side or against a lower large face 40 of the lid body 24 in order to avoid, when the moulded plastic portion 26 is being moulded, air from escaping from the hollow space opening 34 into the polyurethane foam material of the moulded plastic portion 26.

The abutment flange 32 extends into a tab 42, at which the pilot cam 30 is arranged. In order to ensure a defined position of the pilot cam 30 with respect to the lid body 24, the tab 42 supports a spacer rib 44, which serves as a spacer, and which rests against the inner large face 40 of the lid body 24, in a manner corresponding to the sealing rib 38. The spacer rib 44 also has a height of approximately 0.2 mm to 0.3 mm.

LIST OF REFERENCE NUMERALS 1 passenger car
10 vehicle roof
12 roof cutout
14 lid member
16 air deflector
18 air deflector lamella
20A, B deploying arm
22 cam
24 lid body
26 moulded plastic portion
28 insert
30 pilot cam
32 abutment flange
34 hollow space opening
36 ribbing
38 sealing rib
40 inner large face
42 tab
44 spacer rib

The invention claimed is:

1. A lid member of a vehicle roof, comprising:
a plate-like lid body having an inner and an outer large face, to which a moulded plastic portion has been moulded,
the moulded plastic portion configured to receive an insert which is embodied as a hollow body, and which rests against the inner large face of the lid body,
wherein the insert has an abutment flange, which limits a hollow space opening and which is provided with a circumferential sealing rib, which is integral with the insert as a simile piece, and which rests against the inner large face of the lid body.

2. The lid member according to claim 1, wherein the insert is an injection-moulded plastic article.

3. A lid member of a vehicle roof, comprising: a plate-like lid body having an inner and an outer large face, to which a moulded plastic portion has been moulded, the moulded plastic portion configured to receive an insert which is embodied as a hollow body, and which rests against the inner large face of the lid body, wherein the insert has an abutment flange, which limits a hollow space opening and which is provided with a circumferential sealing rib which rests against the inner large face of the lid body; and wherein the circumferential sealing rib is embodied in one piece with the abutment flange.

4. The lid member according to claim 1, wherein the sealing rib, starting from the abutment flange, has a height of 0.1 mm to 0.5 mm.

5. The lid member according to claim 1, wherein the insert comprises a cam for an air deflector of the vehicle roof, the air deflector being deployable as a function of a position of the lid member.

6. The lid member according to claim 5, wherein the insert comprises a pilot cam for the air deflector, the pilot cam being arranged between the cam and a front edge of the lid member.

7. The lid member according to claim 1, wherein the moulded plastic portion is a circumferential edge foam section of the lid body.

8. The lid member according to claim 3, wherein the insert is an injection-moulded plastic article.

9. The lid member according to claim 3, wherein the sealing rib, starting from the abutment flange, has a height of 0.1 mm to 0.5 mm.

10. The lid member according to claim 3, wherein the insert comprises a cam for an air deflector of the vehicle roof, the air deflector being deployable as a function of a position of the lid member.

11. The lid member according to claim 10, wherein the insert comprises a pilot cam for the air deflector, the pilot cam being arranged between the cam and a front edge of the lid member.

12. The lid member according to claim 3, wherein the moulded plastic portion is a circumferential edge foam section of the lid body.

13. A passenger car having a lid member having a plate-like lid body having an inner and an outer large face, to which a moulded plastic portion has been moulded, the moulded plastic portion configured to receive an insert which is embodied as a hollow body, and which rests against the inner large face of the lid body, wherein the insert has an abutment flange, which limits a hollow space opening and which is provided with a circumferential sealing rib which rests against the inner large face of the lid body; and wherein the circumferential sealing rib is embodied in one piece with the abutment flange.

14. A vehicle roof having a lid member having a plate-like lid body having an inner and an outer large face, to which a moulded plastic portion has been moulded, the moulded plastic portion configured to receive an insert which is embodied as a hollow body, and which rests against the inner large face of the lid body, wherein the insert has an abutment flange, which limits a hollow space opening and which is provided with a circumferential sealing rib which rests against the inner large face of the lid body; and wherein the circumferential sealing rib is embodied in one piece with the abutment flange.

\* \* \* \* \*